(12) United States Patent
Damin

(10) Patent No.: US 7,857,266 B2
(45) Date of Patent: Dec. 28, 2010

(54) CONVERTIBLE TAXIDERMY MOUNTING SYSTEM

(76) Inventor: Dale E. Damin, 9453 State Route 141 South, Morganfield, KY (US) 42437

( * ) Notice: Subject to any disclaimer, the term of this patent is extended or adjusted under 35 U.S.C. 154(b) by 104 days.

(21) Appl. No.: 12/077,124

(22) Filed: Mar. 17, 2008

(65) Prior Publication Data

US 2009/0230260 A1 Sep. 17, 2009

(51) Int. Cl.
*A47G 29/00* (2006.01)
*A01N 1/00* (2006.01)

(52) U.S. Cl. .................... 248/126; 248/475.1; 248/558; 428/16; 428/542.4

(58) Field of Classification Search .............. 248/475.1, 248/126, 558, 454, 152, 447.1; D11/132; 40/802, 757; 434/296; 428/542.4, 16
See application file for complete search history.

(56) References Cited

U.S. PATENT DOCUMENTS

| | | | | |
|---|---|---|---|---|
| 624,919 A | * | 5/1899 | Folger | 211/39 |
| 1,203,659 A | * | 11/1916 | Smith | 248/456 |
| 1,457,990 A | * | 6/1923 | Morgan | 248/456 |
| 3,741,402 A | * | 6/1973 | Russell | 211/104 |
| 4,464,440 A | * | 8/1984 | Dotzman | 428/542.4 |
| 4,934,522 A | * | 6/1990 | Nelson | 248/205.2 |
| 5,141,196 A | * | 8/1992 | Arnold et al. | 248/397 |
| 5,472,765 A | * | 12/1995 | Green | 428/99 |

\* cited by examiner

*Primary Examiner*—Anita M King
(74) *Attorney, Agent, or Firm*—Stockwell & Smedley, PSC

(57) ABSTRACT

A convertible taxidermy mounting system includes a stand, to which a specimen is mounted, that attaches to a base in different configurations. In one configuration, the base is oriented to be attached to a wall or similar vertical surface while in a second configuration the base is oriented to be supported on a horizontal surface. However, in both configurations, the specimen is presented in a natural presentation position.

10 Claims, 10 Drawing Sheets

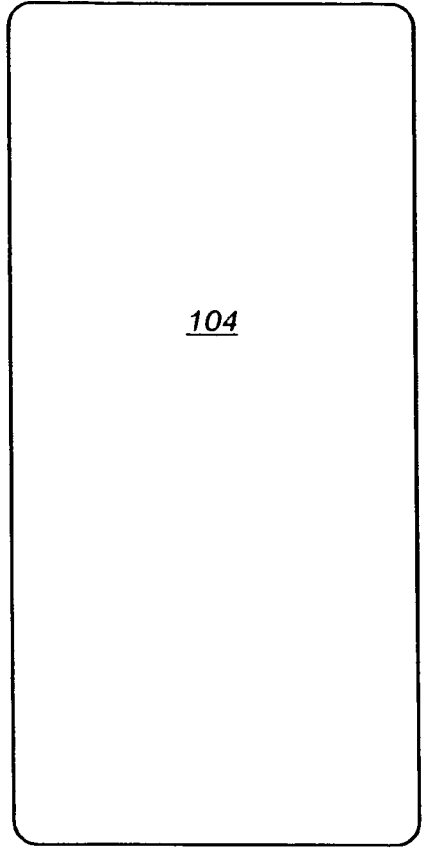
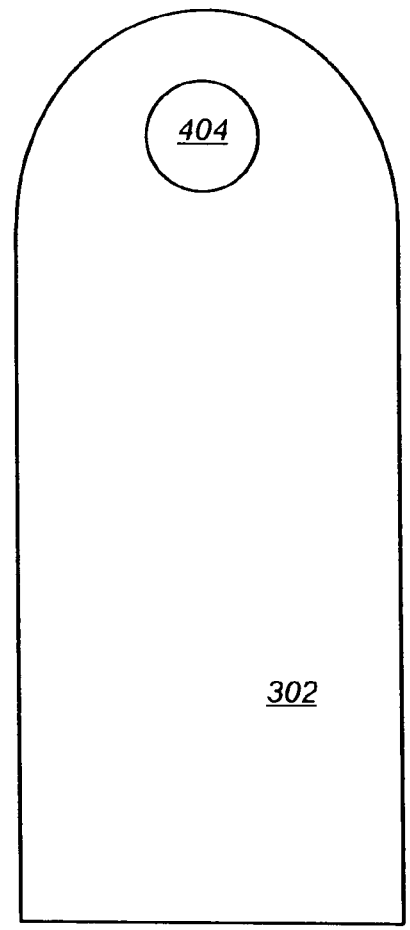
Fig. 7A
Fig. 7B

CONVERTIBLE TAXIDERMY MOUNTING SYSTEM

BACKGROUND OF THE INVENTION

1. Field of the Invention

The present invention relates generally to a taxidermy mount and, more particularly, to a taxidermy mount that may be oriented in different configurations.

2. Description of Related Art

Many sportsmen enjoy mounting as a trophy a specimen that they may have captured or shot while hunting or trapping. Sometimes these mounts can include entire animals, portions of an animal, and even only a head of the animal. Further still, sometimes just the skull is mounted after it has been cleaned or an artificial skull is mounted with real antlers or horns attached thereto.

There are a variety of taxidermy mounts already existing for the above-stated purposes but, regardless of their merits, these mounts include some shortcomings. Some taxidermy mounts are designed to mount the specimen in a configuration that is attached to a wall. Other taxidermy mounts are designed to mount the specimen in a configuration that sits on a tabletop or mantle. However, the choice presented by such mounts is that they can be used as either a vertical mount or a horizontal mount but not both.

Thus, there remains a need for a taxidermy mount that is easily convertible between displaying a specimen in a horizontal configuration or a vertical configuration.

BRIEF SUMMARY OF THE INVENTION

Embodiments of the present invention relate to a convertible taxidermy mounting system that includes a stand, to which a specimen is mounted, that itself attaches to a base in different configurations. In one configuration, the base is oriented to be attached to a wall or similar vertical surface while in a second configuration the base is oriented to be supported on a horizontal surface. However, in both configurations, the specimen is presented in a natural presentation position.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF DRAWINGS

Various aspects of a convertible taxidermy mounting system are illustrated by way of example, and not by way of limitation, in the accompanying drawings, wherein:

FIGS. 5A-8 are illustrations of the individual components that comprise the taxidermy mounting systems of FIGS. 1-4;

DETAILED DESCRIPTION OF INVENTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the description that follows, a taxidermy mounting system is described that is useful for mounting a variety of different trophies. In general, any such trophy will be described as a "specimen" and is meant to encompass a wide variety of trophies. Additionally, the phrase "natural presentation position" is used as understood in this art to refer to a position in which the specimen is oriented so that it appears to be looking at the viewer similar to the way the specimen would do so if encountered in the wild.

The description also provides a specific example that includes exemplary dimensions. This example is based on practicing an embodiment of the invention with a specific specimen—the average, North American white tail deer skull and was designed using about 8 to 10 different skull sizes. This example is provided as a way to show the relative dimensions of the different pieces of the present taxidermy mounting system and is not intended to limit the invention only to mounting deer skulls or only to the specific dimensions described. One of ordinary skill will recognize that the example dimensions included herein can be scaled accordingly to accommodate larger animals such as mule deer, buffalo, etc. or smaller animals such as squirrels and rabbits.

Figure 1:
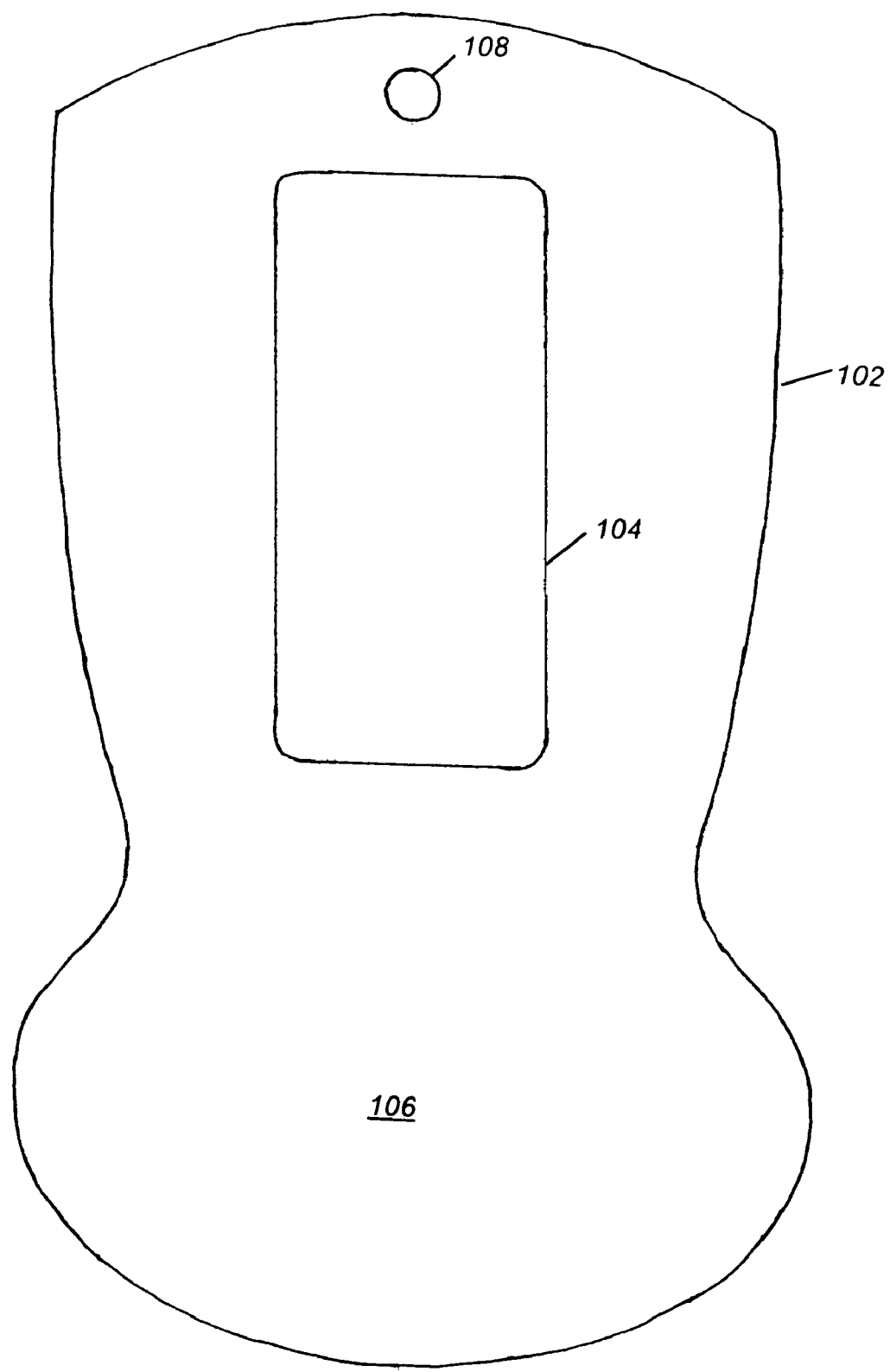
FIG. 1 is a front view of a vertically oriented taxidermy mounting system in accordance with the principles of the present invention.

FIG. 1 is a front view of a convertible taxidermy mounting system in accordance with the principles of the present invention that is oriented in a vertical configuration. The base 102 is designed to hang on a wall or similar vertical surface. It supports an attached platform 104 on which a specimen (not shown) is mounted. In the case of a white-tail deer skull, a dowel 108 is present that fits within the rear of the skull and provides an attachment point to which the specimen can be secured. The base 102 also may include a region 106 that can depict a carving, a picture, a plaque, or some type of decoration. The region 106 can even be omitted without departing from the scope of the present invention such that the base 102 is relatively unadorned.

Figure 2:
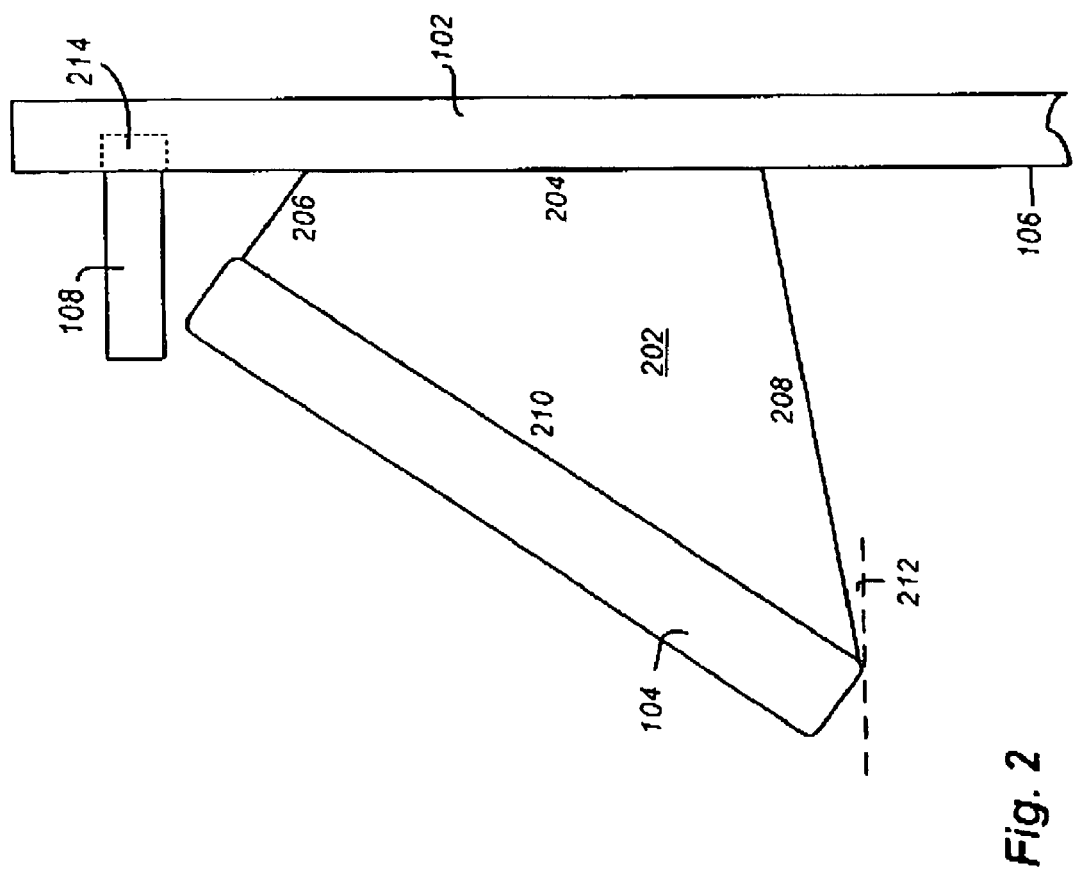
FIG. 2 is a side view of the system of FIG. 1.

FIG. 2 shows a side view of the mounting system of FIG. 1. The base 102 includes a partial recess 214 that accepts the dowel 108. Additionally, the platform 104 is connected to the base 102 through a bridge section 202. The bridge 202 and the platform 104 together form a stand that supports the specimen that is attached to the base 102. In operation, a specimen skull would be secured to the dowel 108 and then extend down along the face of the platform 104 so that the teeth rest on the platform 104 with the nose portion of the skull being near the end of the platform 104 farthest from the dowel 108.

The bridge 202 is a quadrilateral shaped block that is secured to the base 102 and also secured to the platform 104. Typically, screws or glue can be used to accomplish such attachment. The use of screws, or similar removable fasteners, allows easy reconfiguration of the bridge 202 if desired.

The bridge 202, in this configuration, includes a first side 204 attached to the base 102; a second side 206; a third side 208; and a fourth side 210 attached to the platform 104. The various lengths of the sides of the bridge 202 present the platform 104 at an angle 212 relative to a horizontal plane. An angle 212 of about 50 to 60 degrees presents a specimen on the platform 104 in a natural presentation position. The phrase "horizontal plane" depends on the base 102 already being mounted on a vertical surface. One of ordinary skill will recognize, however, that "horizontal plane" is used merely to provide a frame of reference and more generically describes a plane that is orthogonal to the plane in which the base 102 is oriented.

The dowel 108 in this configuration and the configurations that follow is an optional item that may not be needed in every case. For example, many artificial skulls are manufactured with mounting points that allow it to be attached directly to a surface such as the platform 104. In such a case, it is not necessary to secure the specimen relative to the dowel.

As for sizes, the platform 104 is sized such that it is approximately as long as the specimen that it will support. Its width is chosen to accommodate the typical skull and jaw size of the specimen as well. The dowel 108 is made of a material that may be easily cut so that it can be custom fit to accommodate variations in specimen sizes. The length of the base 102 depends on whether the region 106 is present or not. When region 106 is not present, the base 102 can end near the edge of the platform 104. However, when the region 106 is present, it is beneficial to have the size of the base 102 be such that shadows are not cast by the specimen over the decorative portion of the region 106.

Figure 3:
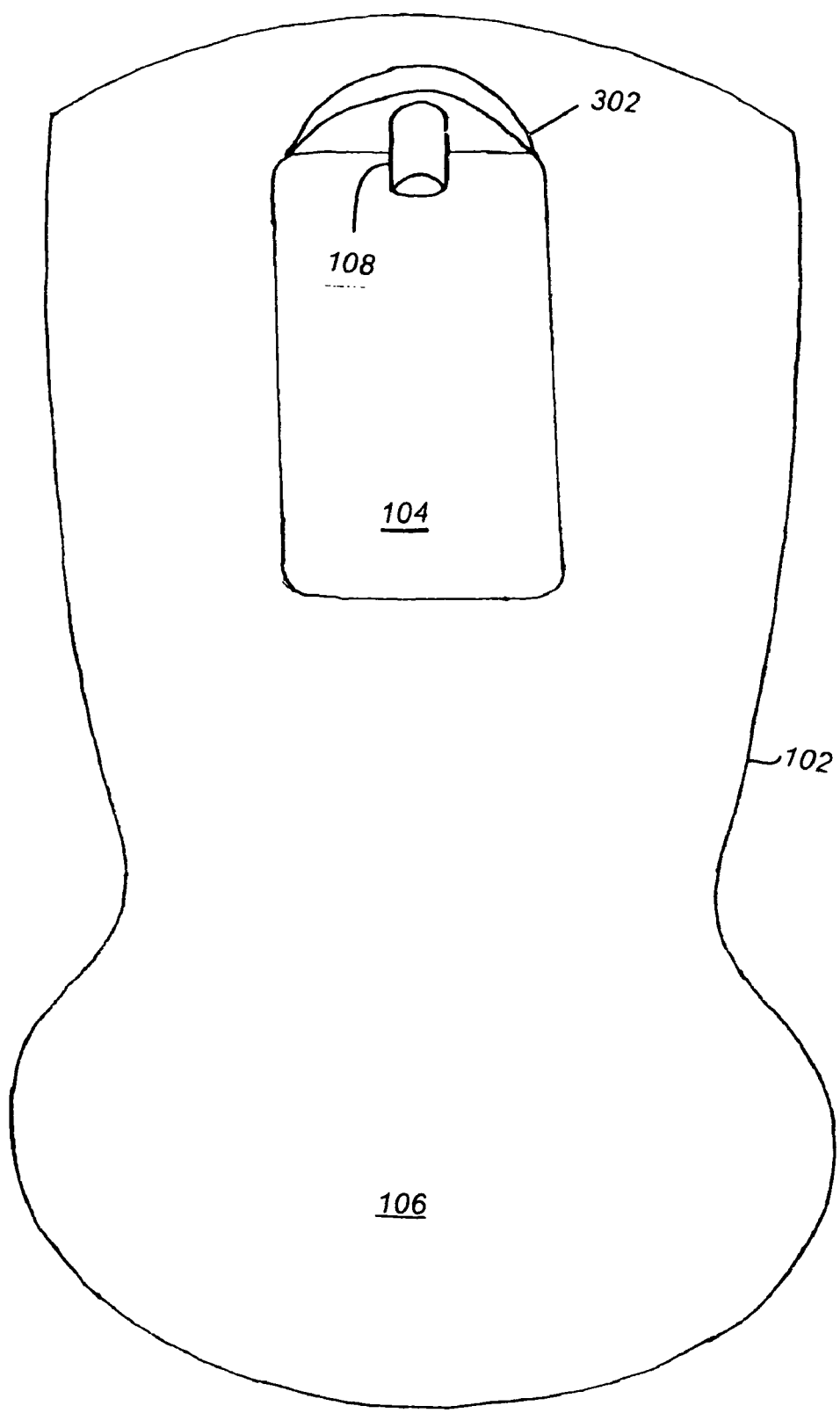
FIG. 3 is a top view of a horizontally oriented taxidermy mounting system in accordance with the principles of the present invention.

FIG. 3 is a top view of the present taxidermy mounting system when configured in a horizontal orientation. The base 102 and platform 104 are the same as before. However, in this configuration a back portion 302 is present that may be used with the dowel 108 to secure the specimen.

Figure 4:
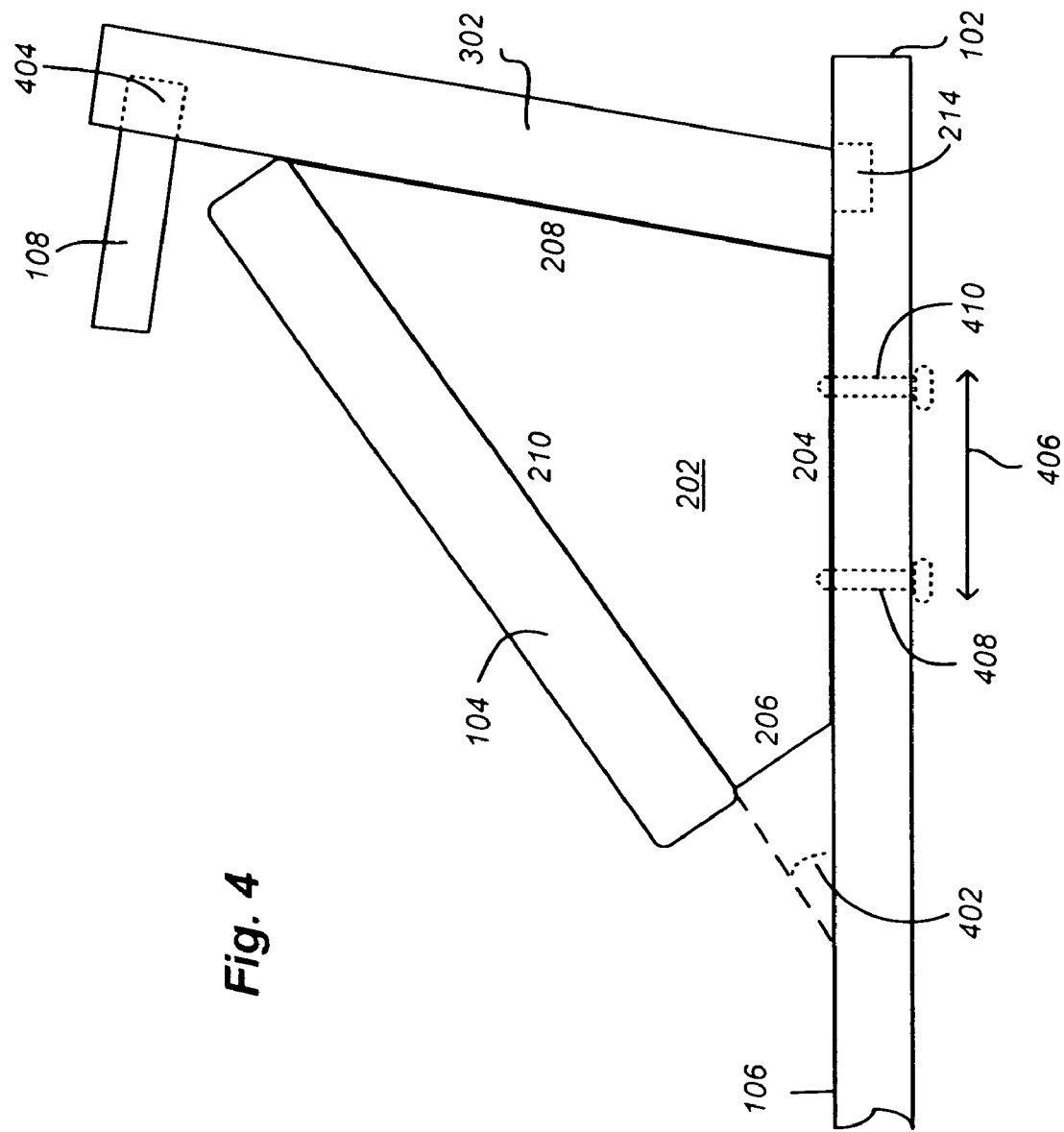
FIG. 4 is a side view of the system of FIG. 3.

The side view of FIG. 4 more clearly shows the components of the mounting system of FIG. 3. The platform 104 is again supported by the bridge 202 and is attached to the base 102. When a dowel 108 is used to secure the specimen relative to the platform 104, a back 302 is provided that attaches to the bridge 202 and includes a recess 404 for accepting the dowel 108. In this configuration, the bridge includes the first side 204 still attached to the base 102; a second side 206; a third side 208 attached to a back 302; and a fourth side 210 still attached to the platform 104. This configuration positions the platform 104 at an angle 402 relative to the horizontal base 102. In general, an angle 402 of between 40 and 50 degrees will present a specimen at a natural presentation position. This reorientation of the bridge 202 can be accomplished by rotating the bridge 202 180° so that the second side now is located near the lower portion (106) of the base 102 rather than the upper portion (near the recess 214) of the base 102.

Shown in a later figure is a slot within the base 102 that allows the position of the bridge 202 to be varied along the length of the base 102 as indicated by the arrow 406. As shown in this side view, the bridge 202 and the back 302 can be located to entirely or partially cover the recess 214 that accepts the dowel 108 in the vertically oriented base 102 shown in FIG. 1. Fasteners, such as screws 408, 410 for example, can pass from the rear of the base 102 through the slot (not shown) and into the side 204 of the bridge 202. If screws, or similar fasteners, are used, then one can be removed so that the bridge 202 is loosened so that it can be rotated between the two configurations and then reattached. Alternatively, the bridge 202 could be entirely removed from the base 102 and then reattached in the appropriate position.

Thus, the platform 104 and bridge 202 can be configured to make a stand that can be used with the base 102 regardless of whether the base 102 is horizontally oriented or vertically oriented. In both configurations, the platform 104 is angled relative to the viewer so as to present a mounted specimen in a natural presentation position.

In some instances, the convertible taxidermy mounting system just described may be assembled in one configuration and have accompanying directions describing how to disassemble and change the system to the other configuration. Alternatively, the system can come as unassembled components along with instructions on how to assemble the pieces in either configuration. In this second alternative, it may be beneficial to include two dowels in case slightly different dowel lengths are useful for the different configurations.

FIGS. 5A-8 describe the various components of the system in greater detail. Again, the specific example provided is directed to use of the system for white-tail deer skulls and is not intended to limit the invention to only these dimensions. One of ordinary skill will readily recognize how to scale the exemplary dimensions provided in order to accommodate specimens of larger or smaller sizes. As for materials, the components of the system may be constructed from a variety of wood species and also from artificial materials that readily substitute for wood. In particular, engineered products, similar to MDF may beneficially be used.

Figure 5A:
Figure 5B:
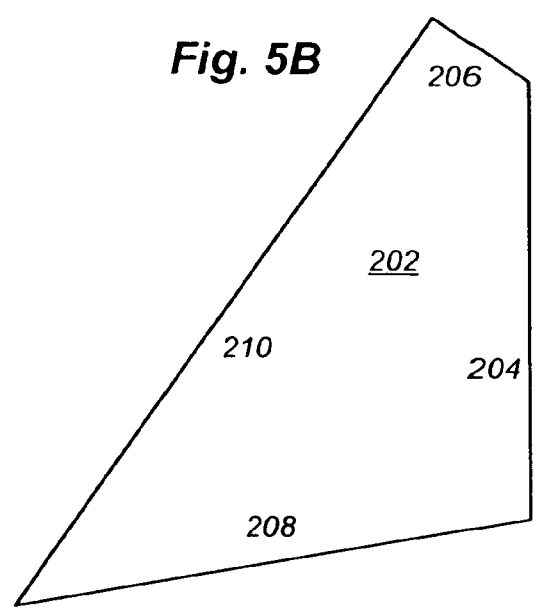

FIG. 5A shows a side view of the platform 104. The length of the platform, for an average North American white-tail deer is about 7¾ inches and a useful thickness is about ¾ inch. FIG. 5B is a side view of the bridge 202 that is a four-sided block approximately 1 inch in thickness. The first side 204 is about 4¾ inches, the second side 206 is about 15/16 of an inch, the third side 208 is about 5⅜ inches, and the fourth side is about 7⅝ inches. These measurements and any other measurements described herein are approximate and each may vary by about ⅛ inch.

Figure 6B:
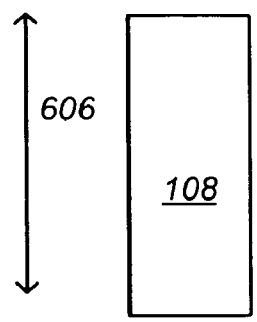
Figure 6C:
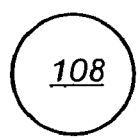
Figure 6A:
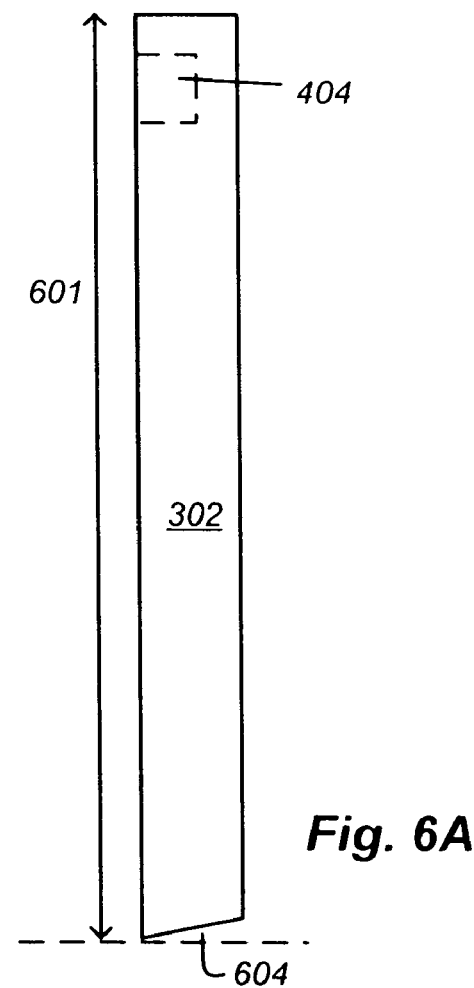

FIG. 6A depicts a side view of the back 302 that is about 8 inches in height 601 on its longest face. The bottom is beveled relative to its front face so as to create an angle 604. The angle 604 is between about 10 and 15 degrees. FIGS. 6B and 6C depict an exemplary dowel 108 whose length 606 can be arbitrary. One example is to make the dowel about 3 inches long so that it can be cut down to a length between 1½ to 2½ inches in length to accommodate variations in specimens. An end-view of the dowel 108 reveals a diameter 608 that can be about ¾ of an inch.

FIG. 7B is a front view of the back 302 showing the recess 404 that is sized to accommodate the dowel 108 and is positioned about 1¼ inches, on center, away from the top edge. The height, as shown before, is about 8 inches and the width of the back 302 is about 3½ inches. FIG. 7A shows the platform 104 having a height of about 7¾ inches and a width of about 3½ inches.

Figure 8:
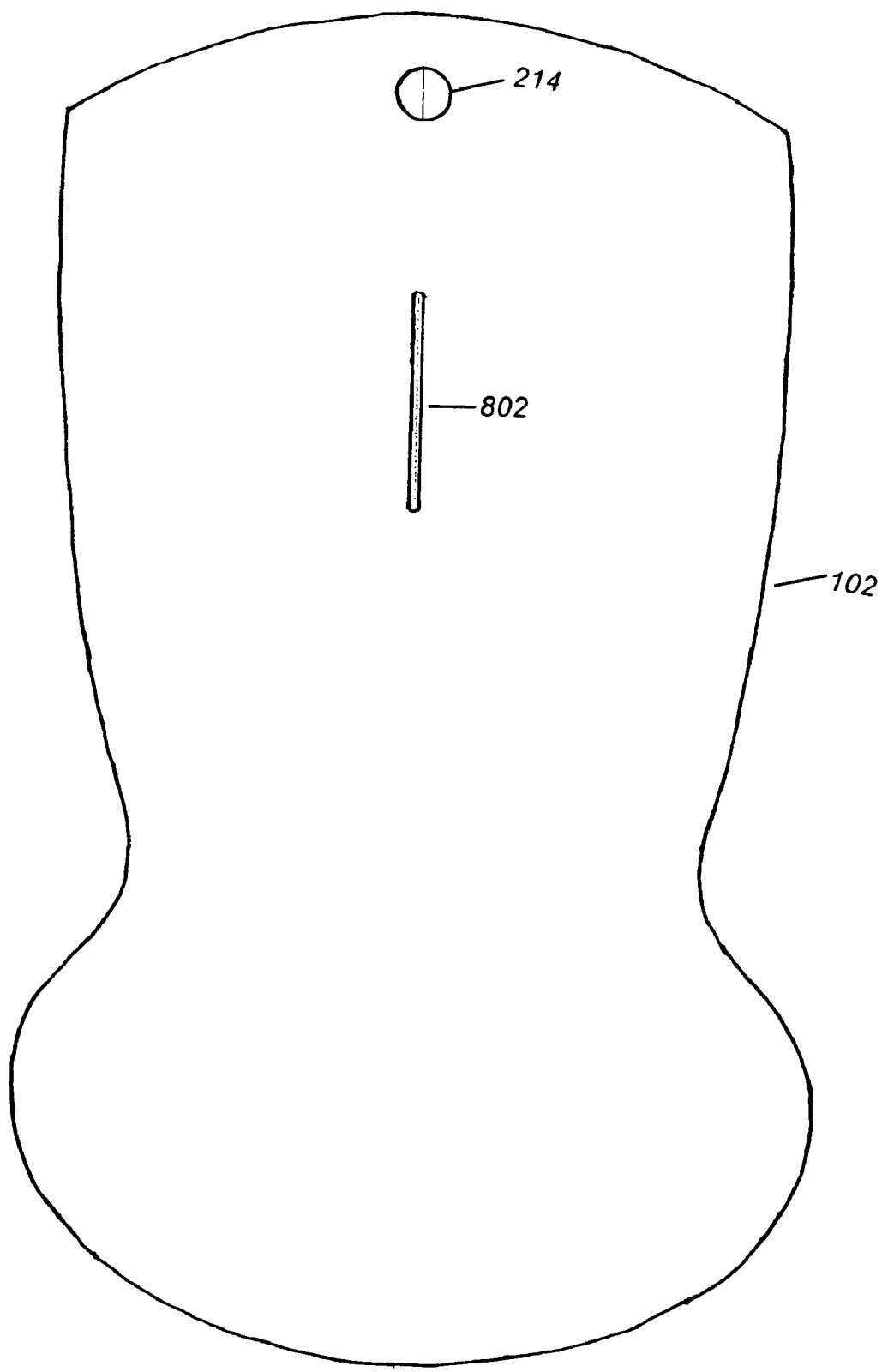

FIG. 8 is a front view of the base 102 and, in general, has a length of about 14½ inches and a width that can vary depending on design. The recess 214 that accepts the dowel 108 is located about 1¼ inch, on center, from the top edge of the base 102. A slot 802 may be present that allows some flexibility in positioning the bridge 202. For example, screws (not shown) may be used enter into the slot 802 from underneath and then pierce the bridge 202. The slot 802 allows the screws to be moved up or down its length before the screws are tightened (see FIG. 4). In this way, the precise position of the bridge 202 on the face of the base 102 can be altered to accommodate variations in potential specimens and to allow different locations of the bridge 202 when the mounting system is in its different configurations. In particular if two screws are used that are spaced 2 inches apart to connect the bridge 202 to the base 102, the slot 802 could be 2½ inches long to allow ½ inch of movement when placing and securing the bridge 202. Spacing the screws closer together and/or lengthening the slot 802 will allow even greater variations to be accommodated.

Figure 9:
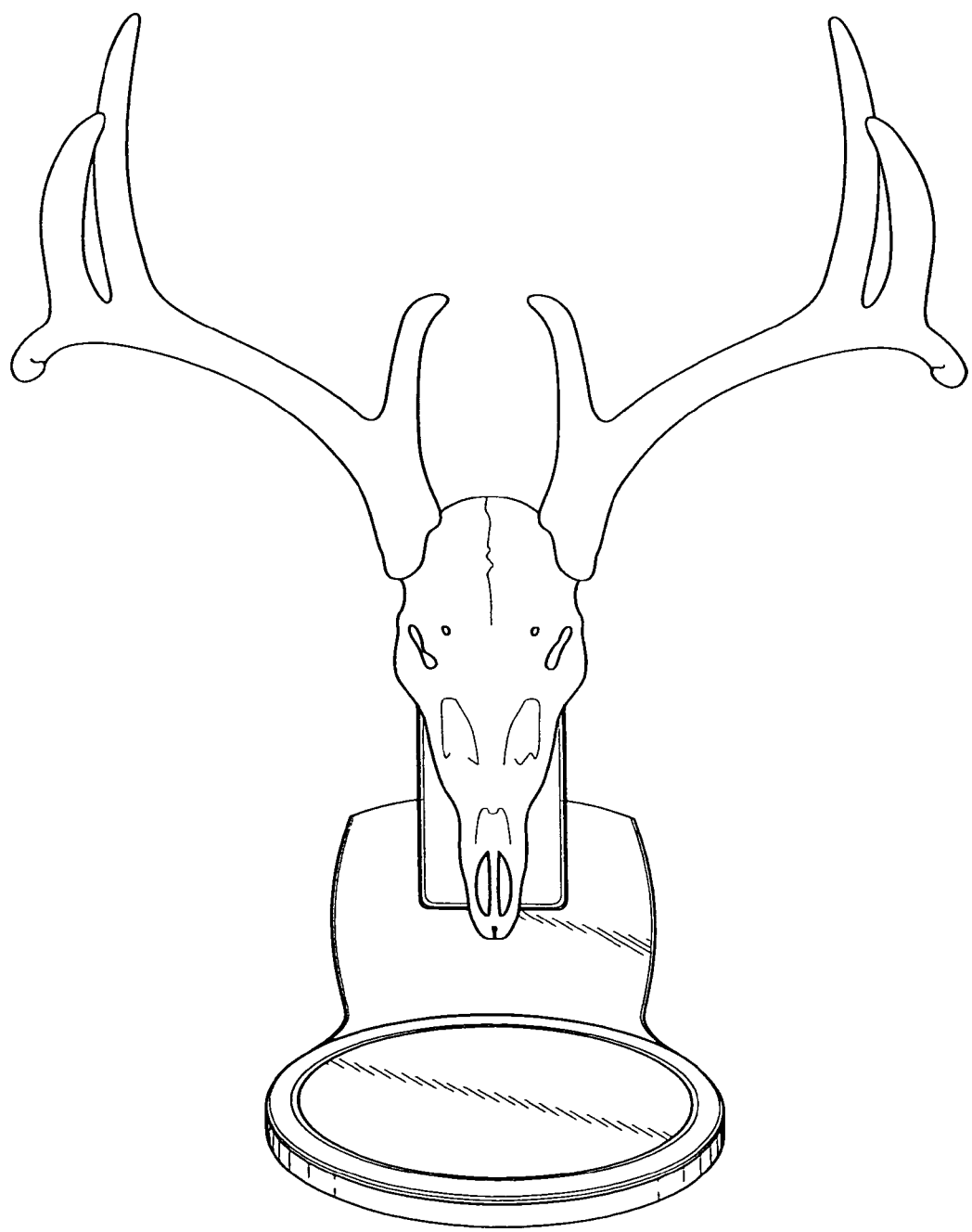
FIG. 9 depicts a skull specimen mounted in a horizontally oriented configuration in accordance with the principles of the present invention.
Figure 10:
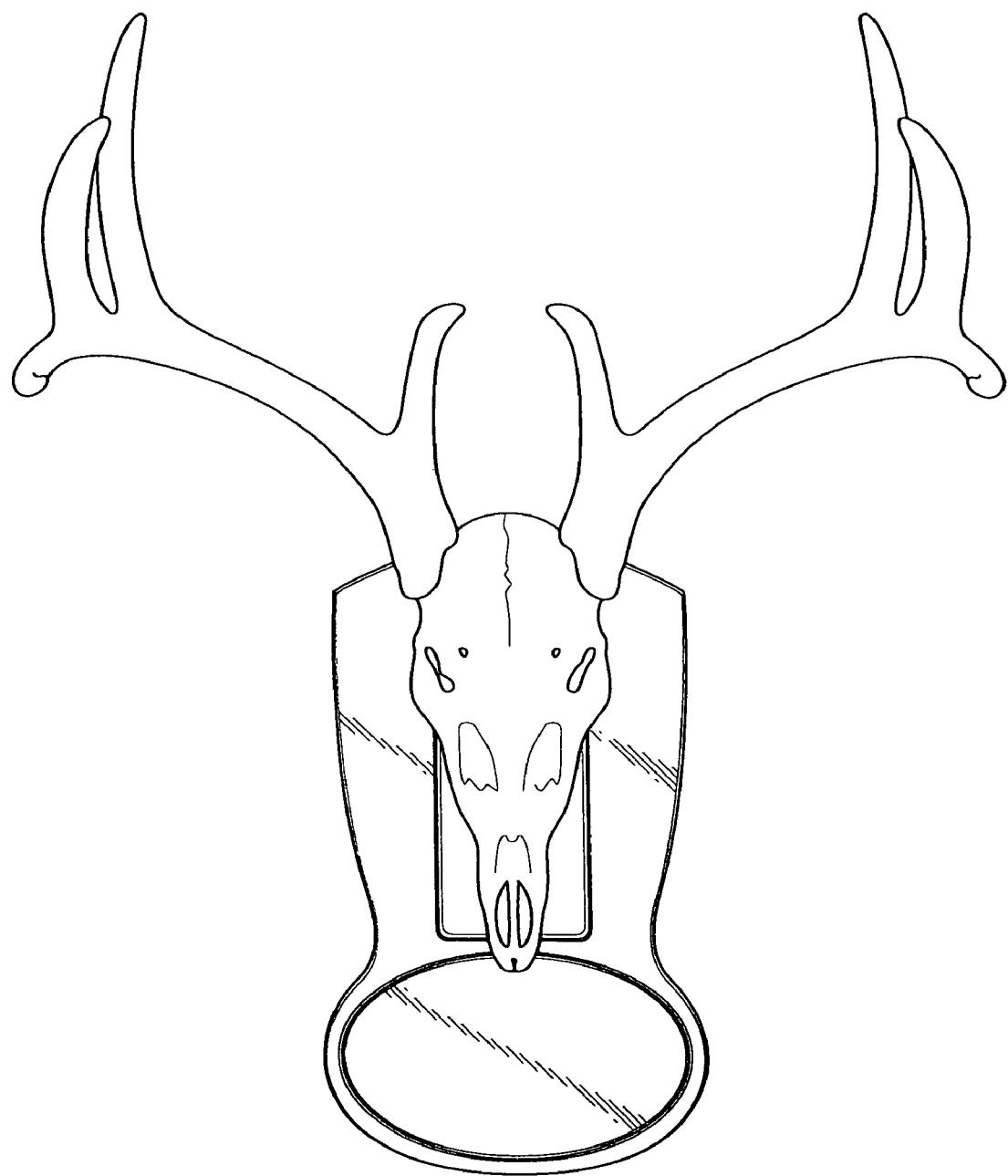
FIG. 10 depicts a skull specimen mounted in a vertically oriented configuration in accordance with the principles of the present invention.

FIG. 9 depicts a skull specimen mounted in a horizontally oriented configuration in accordance with the principles of the present invention, while FIG. 10 depicts a skull specimen mounted in a vertically oriented configuration in accordance with the principles of the present invention.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A convertible taxidermy mount comprising:
   a platform;
   a base orientable between a first orientation and a second orientation, the second orientation substantially perpendicular to the first;
   a bridge coupled with the platform and the base configured to support the platform, the bridge configurable between a first configuration when the base is in the first orientation, and a second configuration when the base is in the second orientation; wherein the bridge comprises a block having two face surfaces and first, second, third and fourth sides;
   a dowel having a first end coupled to the base and extending outward perpendicular from the base to a second end providing a securing point for the specimen; and
   the platform further configured to support a specimen in a natural presentation position when the bridge is in the first configuration and also when the bridge is in the second configuration, wherein in both the first configuration and the second configuration, the first side is coupled to the base and the fourth side is coupled to the platform.

2. The mount of claim 1, wherein the two face surfaces are oriented in a plane perpendicular to that of the base.

3. The mount of claim 1, wherein in the first configuration the second side is located proximate a first end of the base and in the second configuration the second side is located opposite the first end of the base.

4. A convertible taxidermy mount comprising:
   a platform:
   a base orientable between a first orientation and a second orientation, the second orientation substantially perpendicular to the first;
   a bridge coupled with the platform and the base configured to support the platform, the bridge configurable between a first configuration when the base is in the first orientation, and a second configuration when the base is in the second orientation; wherein the bridge comprises a block having two face surfaces and first, second, third and fourth sides;
   a back coupled to the third side, when in the second configuration and not the first configuration;
   a dowel having a first end coupled to the back and extending outward perpendicular from the back to a second end providing a securing point for the specimen; and
   the platform further configured to support a specimen in a natural presentation position when the bridge is in the first configuration and also when the bridge is in the second configuration, wherein in both the first configuration and the second configuration, the first side is coupled to the base and the fourth side is coupled to the platform.

5. The mount of claim 1, wherein in the first configuration a front surface of the platform is oriented in a plane angled between about 50 to 60 degrees relative to a horizontal plane.

6. The mount of claim 1, wherein in the second configuration a front surface of the platform is oriented in a plane angled between about 40 to 50 degrees relative to a plane of the base.

7. A convertible taxidermy mounting kit for assembly, comprising:
   a base orientable between a first orientation and a second orientation, the base including a top portion and a bottom portion;
   a platform configured to support a specimen;
   a bridge configured to be coupled to the base and to support the platform;
   a dowel configured to be coupled to the base and to provide a securing point for the specimen:
   wherein the base is orientable to be attached to a vertical surface in the first orientation and to be supported by a horizontal surface in the second orientation:
   and the bridge is configurable to be coupled to the base in a first configuration when the base is in the first orientation, and to be coupled to the base in a second configuration when the base is in the second orientation, such that when the bridge is in the first configuration the platform is supported so as to present the specimen in a natural presentation position and when the bridge is in the second configuration the platform is supported so as to present the specimen in the natural presentation position.

8. The mounting kit of claim 7, further comprising:
   a back configured to be coupled to the bridge and be supported on the base.

9. The mount of claim 7, wherein the bridge comprises a block having two face surfaces and first, second, third and fourth sides and wherein:
   in the first configuration and in the second configuration, the first side is configured to be coupled to the base and the fourth side is configured to be coupled to the platform while
   in the first configuration, the second side is configured to located proximate the top portion and in the second configuration, the second side is configured to he located proximate the bottom portion.

10. The mount of claim 9, further comprising:
    a back, wherein in the second configuration the back is configured to be coupled to the third side of the bridge.

* * * * *